United States Patent [19]

Yeh

[11] Patent Number: 4,794,640
[45] Date of Patent: Dec. 27, 1988

[54] SWITCHING CONTROL APPARATUS FOR INTERCOM-TELEPHONE SETS

[75] Inventor: Kou-I Yeh, Taipei, Taiwan
[73] Assignee: Inventa Electronics Co., Ltd., Taipei, Taiwan
[21] Appl. No.: 17,840
[22] Filed: Feb. 24, 1987
[51] Int. Cl.$^4$ ............................................. H04M 9/08
[52] U.S. Cl. .................................. 379/388; 379/160; 379/412
[58] Field of Search ............... 379/387, 388, 167, 412, 379/422, 424, 159, 160, 420

[56] References Cited

U.S. PATENT DOCUMENTS

| | | | |
|---|---|---|---|
| 3,896,275 | 7/1975 | Wilson | 379/422 |
| 4,091,244 | 5/1978 | Chu et al. | 379/423 |
| 4,360,710 | 11/1982 | Chaput et al. | 379/412 |
| 4,475,012 | 10/1984 | Coulmance | 379/412 |

FOREIGN PATENT DOCUMENTS 2043398  10/1980  United Kingdom ............... 379/387

Primary Examiner—Thomas W. Brown
Assistant Examiner—Wing Fu Chan
Attorney, Agent, or Firm—Ladas & Parry

[57] ABSTRACT

A switching control apparatus for intercom-telephone sets includes a switching control circuit and a surge protection circuit electrically coupled with a talking circuit for increasing the reliability of the intercom-telephone operation, reducing the cost of manufacturing the product and protecting the intercom-telephone sets against high voltage surges which may damage the intercom-telephone sets during electrical storms.

1 Claim, 3 Drawing Sheets

SWITCHING CONTROL APPARATUS FOR INTERCOM-TELEPHONE SETS

BACKGROUND OF THE INVENTION

1. Field of the Invention

This invention relates to a switching control apparatus, and more particularly to the type of switching control apparatus for intercom-telephone sets.

2. Description of the Prior Art

A conventional switching device for intercom-telephone sets usually uses relays or transistors to perform the switching operation. When the telephone set is in use and the handset is off the hook, as shown in FIG. 1, contact A of the switch SW1 is connected to contact E, and contact C of the switch SW2 is connected to contact F, and the potential of pin HKC of dial IC A5 of the keyboard A6 goes to a high level so as to drive transistor Q1 to turn on relay RLY1. Meanwhile, current from the telephone line T-R will turn on transistor Q2 via relay RLY1 and flow into the intercom-telephone set through contacts C and F of the switch SW2 coupled with the telephone set for dialing and talking. When talking is ended, pushing key SPK makes the potential of the pin HKC of the dial IC A5 drop to a low level, and transistor Q1 is therefore turned off. As a result, the relay RLY1 returns to its open position, current from telephone lines T-R is cut off, and the intercom function is accomplished.

This switching operation all depends on the relay RLY1. Since the switching of known relays is effected by mechanical contact, instant current passing through the contacts easily generates sparks during on and off operations so that life expectancy and reliability of the relays are greatly affected. Moreover, the known relays can not withstand a high voltage surge. When telephone lines receive roughly a 800 v surge from lightning during electrical storms, the relays will be damaged, resulting in great trouble to the intercom-telephone set and even possibly harm to the user.

Another known switching device for intercom-telephone set is as shown in FIG. 2, a device which has overcome the disadvantage of using relays by substituting transistors. As can be seen in FIG. 2, when the handset is off the hook, current from the telephone lines T-R flows via inverter D1–D4, the switch SW$_o$, which is closed connecting contact G to contact H, the current flowing into the base of a second transistor Q2, which is turned on, together with a first transistor Q1 so as to energize the talking circuit A2 for effecting dialing and talking through the intercom-telephone set A3. If the handset is not to be held by the user, it has to be positioned in a handset recess (as shown), and the switch SW remains in an open state. When the key SPK of keyboard A6 is pressed, the potential of pin HKC of dial IC A5 goes to a high level so that transistors Q4 and Q3 are turned on in sucession. The current flows from T-R terminal via inverter D1–D4 and passes through transistor Q3 to the speaker-phone circuit A3. Thus the user can talk through the microphone ECM without holding the handset.

When talking is over, the handset is placed on the hook, the key SPK is pusked once again, the pin HKC of dial IC A5 falls to a low level, and Q3, Q4 are turned off. When the switch SW1 is off, Q1 is also cut off, together with the telephone lines T-R. Therefore, the telephone lines T-R remains at break condition with respect to the intercom-telephone set.

Although the transistor circuit provided in the second prior art schematic of FIG. 2 has ameliorated the disadvantage of the relay circuit shown in FIG. 1, disadvantages still remain because, in order to prevent the telephone circuit from being damaged by a lightning surge during electrical storms, special transistors such as those which can resist high voltage have to be used. Thus, the cost of manufacturing for an intercom-telephone set is increased.

SUMMARY OF THE INVENTION

It is a primary object of this invention to provide an improved switching control apparatus for intercom-telephone sets with a switching device composed of surge absorbers SCR's and transistors so as to increase the stability and reliability thereof and decrease the cost of the product as well.

It is another object of this invention to provide an improved switching control apparatus for intercom-telephone sets with a switching device which is not only resistant to high voltage surges genetated by electrical storms but is also inexpensive to manufacture.

These and other objects are achieved by providing an improved switching control apparatus for intercom-telephone sets with a switching and protection circuit mainly composed of a plurality of surge absorbers and transistors as well as an SCR arrangement, so that circuit protection is ensured.

BRIEF DESCRIPTION OF THE DRAWINGS

This invention will become clear from the following description of a preferred embodiment in conjunction with the accompanying drawings, in which.

DETAILED DESCRIPTION OF THE PREFERRED EMBODIMENT

Figure 1:
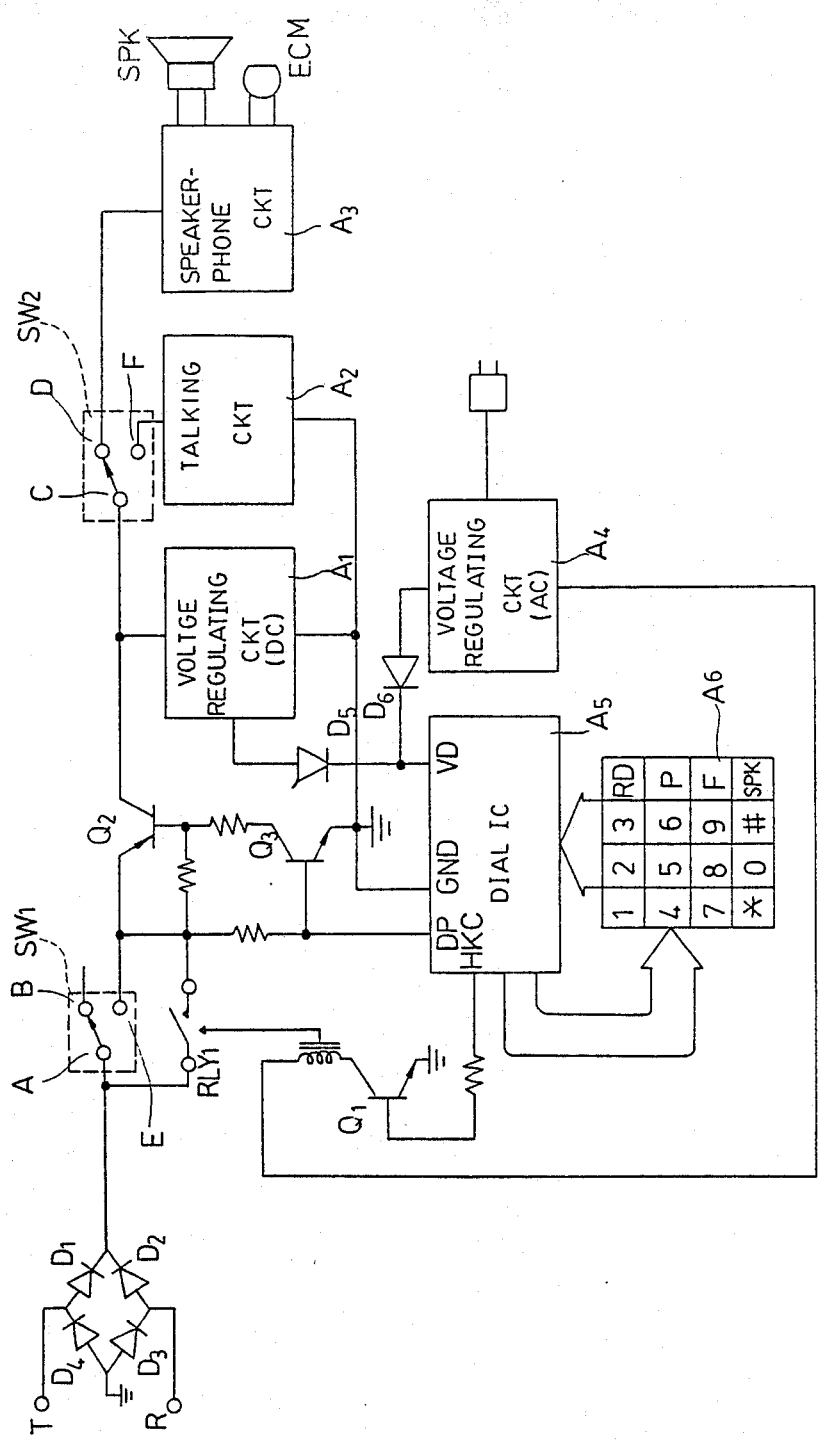
FIG. 1 is a block diagram of a known switching device with a relay circuit for an intercom-telephone set.
Figure 2:
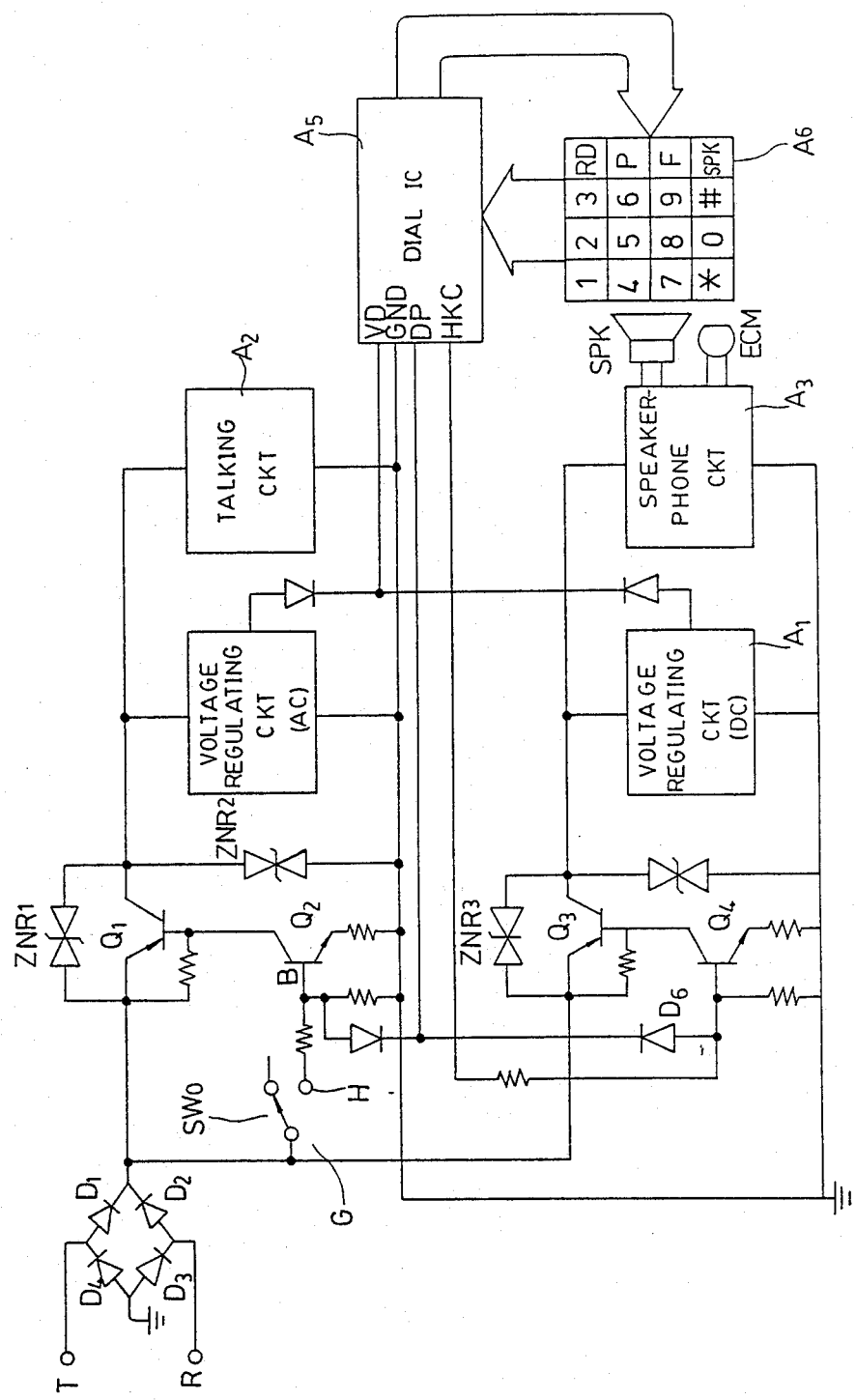
FIG. 2 is a block diagram showing another known switching device with a transistor circuit for an intercom-telephone set.
Figure 3:
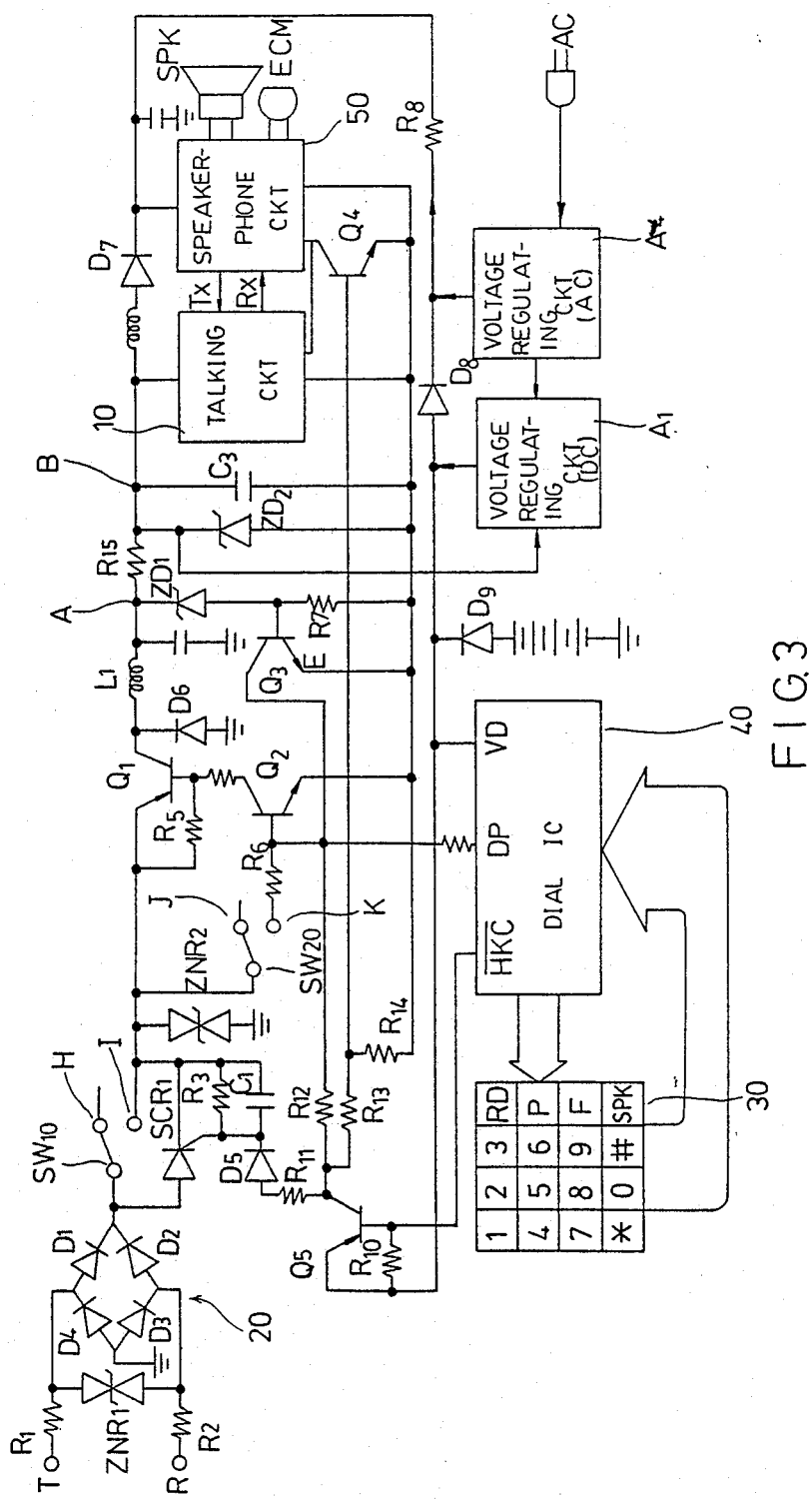
FIG. 3 is a block diagram of a preferred embodiment of a switching control apparatus for an intercom-telephone set according to this invention.

Referring now to FIG. 3, in which a switching control apparatus for intercom-telephone sets according to this invention includes a known portion, which, as mentioned hereinbefore, is combined of a talking circuit 10, a speaker-phone circuit 50 coupled with a keyboard 30 and a dial IC 40, a DC voltage regulating circuit A1 and an AC voltage regulating circuit A4 connected in series between an AC power source and the talking circuit 10; and an improved portion. This latter portion comprises a switching and protection arrangement 20 electrically connected between the talking circuit 10 and the dial IC circuit 40 for effecting intercom-telephone operation without taking the handset off the hook. As shown in FIG. 3, a surge protection circuit comprises a pair of resistors R1 and R2 each being series-connected to each telephone line T and R, a first surge absorber ZNR1 parallel-connected to each output terminal of the resistors R1 and R2 as well as to each output terminal of a bridge rectifying circuit D1–D4 for protection against high voltage, and a silicon controlled rectifier unit SCR1 which has its anode connected to the output of the bridge rectifying circuit D1–D4 and to a pole of first switch SW10, its cathode connected to a contact I of the first switch SW10 and its gate coupled with the cathode of a diode D5. An R-C circuit R3-C1 couples the cathode and gate of SCR1. A second surge absorber ZNR2 has one end connected to the contact I of the first switch SW10 and the other end grounded, while a transistor circuit Q1-Q2 has its input coupled with the second surge absorber ZNR2 through a second switch SW20, and a voltage regulating circuit composed of a plurality of zener diodes ZD1, ZD2 and a transistor Q3 are coupled between the output of the transistor circuit Q1-Q2 through an inductor L1, and the input of the talking circuit 10 through a capacitor C3. Operations of the switching and protection arrangement 20 are as follows:

As shown in FIG. 3, when the handset is on the hook, the first switch SW10 is kept in its open position by the weight of the handset, and pin HKC of dial IC 40 is of high impedance when the key SPK is not pushed, Q5 is not conductive and neither is the SCR1. Therefore, the telephone lines T-R electrically coupled with the talking circuit 10 through the switching and protection arrangement 20 remain in an open state.

When the telephone rings, or when the user wants to make a phone call, the handset is taken off the hook, the first switch SW10 is connected to contact I, and the second switch SW20 is connected to contact K. Signals coming from the telephone lines T-R pass through resistors R1-R2 and the first surge absorber ZNR1, and develop across the rectifying circuit D1-D4 and the second surge absorber ZNR2 through the second switch SW20 to turn on the transistor circuit Q1-Q2, and, by way of the inductor L1 and resistor R15, feed into the talking circuit 10 for effecting telecommunication. When the telecom operation is terminated and the user puts the handset on the hook, the first switch SW10 is pushed to open the contact I from contact H, and the telephone lines T-R resume break condition with respect to the talking circuit 10. Since the handset is on the hook and the first switch SW10 is open circuited transistor, Q2 is also cut off, the second switch SW20 is open again, and transistor Q1 is also cut off so as to finish the talking function.

When the user wants to make an intercom-call or answer a phone call without holding the handset in hand, the handset remains on the hook, and both switches SW10 and SW20 are also kept in an open state, so that the first and second transistors Q1 and Q2 are also kept in an "off" state as they are when the talking function has ended as described above. Then, when the key SPK is pressed on keyboard 30, the condition of a pin HKC in the dial circuit 40 is changed from high impedance to low impedance, causing the fifth transistor Q5 to conduct with signal current flowing from the collector of Q5 into three different paths: one is by way of resistor R11 and diode D5 to trigger the gate of the signal path normally via first SCR1 and turn it on, so that the first switch SW10 is closed another path is by way of resistor R12 and the base of the second transistor Q2 to turn on Q2 and subsequently the first transistor Q1; and the third path is via resistor circuit R13-R14 to divide voltage so as to turn on the fourth transistor Q4, making the speaker-phone circuit 50 operative thereat, and the talking circuit 10 is therefore electrically actuated to connect with the telephone lines T-R so that the microphone ECM of the speaker-phone circuit 50 is functionally coupled with the intercom set of the other party through the connecting circuit Tx and Rx provided between talking circuit 10 and the speaker-phone circuit 50. Meanwhile, signals from the intercom circuit of other party come through the telephone lines T-R, and, by way of resistors R1, R2, the first surge absorber ZNR1 and the rectifying circuit D1-D4, pass through the first SCR1, which has already been turned on thereat, and further by way of the first transistor Q1, inductor L1, and resistor R15, cross the talking circuit 10 and the connecting circuit Rx to the speaker-phone circuit 50 for energizing the microphone ECM thereof to effect intercom function, of which the audio signals pass through the connecting circuit Tx and the talking circuit 10, and subsequently through resistor R15, inductor L1, the first transistor Q1, first SCR1, the rectifying circuit D1-D4, the first surge absorber ZNR1, the resistors R1, and R2, and are transmitted to the intercom circuit of the other party via the telephone lines T-R for performing intercom talking.

When intercom talking is finished, by pushing key SPK at the keyboard 30, the potential of pin HKC of dial IC 40 will be changed from high level to low level, cutting off transistor Q5, and terminating the triggering signal from being passed through the gate of the first SCR1 (but the SCR1 is still kept in conduction at the time the gate stops triggering) with the potential from resistor R12 to the base of transistor Q2 being subsequently dropped to zero and becoming cut off. After the cut-off of Q2, the current (I-hold) of both the anode and cathode of the first SCR1 is dropped to zero, and the SCR1 is thus turned off. Meanwhile, the potential from R13-R14 to transistor Q4 is also goes to zero, and transistor Q4 is cut-off, causing the speaker-phone circuit 50 to be turned off thereat. Therefore, the telephone lines T-R resume their break condition with the talking circuit 10 since the first SCR1 is turned off.

Operations concerning the surge protection circuit according to the present invention are as follows:

In accordance with the regulation of the Electronics Industries Association (EIA) of the U.S.A., the voltage surge withstanding of a telephone under EIA regulation must be able to rise instantly to a crest of 800 v in 10 $\mu$sec and then fall to zero in 560 $\mu$sec, and when a telephone suffers such a surge, it must not be damaged and must continue to operate normally.

When a surge reaches the T-R of the telephone input terminal, as shown in FIG. 3, with the handset on hook, the surge is suppressed by the combination of ZNR1 and R1-R2 respectively coupled with the telephone lines T-R. Since the voltage rating of the first surge absorber ZNR1 is 360 v, if the voltage surge exceeds 360 v, the first ZNR1 assumes a low impedance (under normal condition, it maintains a rating below 360 v as a high impedance) and shorts out the excess. That is to say, the surge absorber ZNR1 acts like a zener diode in that it will allow only a certain amount of voltage to appear across its terminals. If a greater voltage incidentally appears, the surge absorber becomes a short circuit to any amount of voltage in excess of its rating. With the combination of R1-R2-ZNR1 to divide the voltage surge equally, the voltage across the ZNR1 is always confined to less than 360 v, making the current surge which flows to the rectifying circuit D1-D4 minimal so that no surge can cause damage to the circuit D1-D4 and SCR1.

When intercom talking is in progress and an accidental high-voltage surge occurs, the operation of R1-R2-ZNR1 as described above can first attenuate the surge to 360 v, and, as the first switch SW10 is already turned on and protects the SCR1 against the surge, the contact of SW10 itself is a mechanical contact strong enough to withstand 360 v, and the current surge, which flows to the first switch SW10 through R1-R2-ZNR1, is already minimized by the division of current so that no harm will be done to the SW10. On the other hand, the second surge absorber ZNR2, which has a voltage rating of 100 v will further cut down the surge, coming from the first switch SW10, to less than 100 v so as to protect transistor Q1 and other components against the surge. Moreover, when the voltage potential of the anode A of the zener diode ZD1 rises to 24 v for turning itself on, the resistor R7 provides a bias to turn on transistor Q3, and the collector of Q3 will go low thereby bringing the base of transistor Q2 low (to a voltage level of 0.2 v) so that transistor Q2 is cut off, as is transistor Q1, thus preventing the 100 v of voltage surge from flowing into the talking circuit 10. At this time, the potential of point A drops to zero again, turning off ZD1, and resistor R7 has no bias so transistor Q3 is cut off but transistor Q2 is turned on. Then, the potential of point A rises up again to 24 v, turning on ZD1 and subsequently transistor Q3 is turned on, but transistors Q2 and Q1 are cut off. This repeatedly changing condition of the potential at point A is always confined to between zero and 24 v, and this potential is also attenuated by R15 and ZD2 so as to further confine the potential of point B to below 18 v so that this low potential cannot damage the talking circuit 10, and protection against a high voltage surge is therefore achieved.

If the intercom-telephone circuit is struck during normal talking operation with the handset off hook, the surge suppression, is similar to the operation as described above, and the voltage surge can be attenuated in 360 v. At this time, the SCR1 is turned on because the first switch SW10 is open (being connected to contact I), and the SCR1 can withstand 360 v of voltage surge (for this reason, the configuration of the first SCR1 according to this invention is designed to withstand voltage surge of 600 v and current surge of 20a so as to protect itself against a high voltage surge), and the voltage surge passing SCR1 to ZNR2 will also fall to less than 100 v to protect transistor Q1 and the subsequent talking circuit 10. When the potential of point A rises to 24 v, the zener diode ZD1 is turned on, and with a bias obtained by resistor R7, transistor Q3 is also turned on. As the collector of transistor Q3 makes the base of transistor Q2 go to a low voltage level (0.2 v), transistor Q2 is thus cut off, and so is Q1, preventing an excess voltage surge of 100 v from flowing into the speaker-phone circuit 50. At this time, the potential of point A falls to zero again, ZD1 is turned off, and resistor R7 has no bias to turn on transistor Q3, which turns on transistor Q2, causing point A to rise to 24 v and subsequently repeating the operation as described above. Thus, the changing potential of point A between 24 v and zero volt will enable the potential of point B to be confined to below 18 v through limiting action of resistor R15 and the second zener diode ZD2. Therefore, this low potential is not enough to damage the talking circuit 10 and speaker-phone circuit 50 so as to completely effect protection against the high voltage surge.

What is claimed is:

1. A switching control apparatus for intercom-telephone sets having a speaker-phone circuit coupled with a speaker and a microphone, a dial circuit with a keyboard electrically connected to the speaker-phone circuit, a talking circuit with its output connected to an input of the speaker-phone circuit, and a pair of voltage regulating circuits connected in series between an AC power source and the talking circuit, comprising:

a pair of resistors one end of each being respectively series-connected to a pair of incoming telephone lines at one end and the other end of each resistor being shunted by a first surge absorber for protection against high voltage;

a rectifying circuit having its input connected to both output terminals of said resistors and its output coupled with a first switch of the intercom-telephone set for allowing low-voltage incoming signals to pass therefrom; and a silicon controlled switching circuit having its anode connected to an output terminal of said rectifying circuit, its cathode connected to a contact of said first switch, and its gate coupled with a unilateral conductive element of the talking circuit through a second surge absorber and a transistor circuit for performing switching control operations of the intercom-telephone set.

* * * * *